United States Patent
Watts

(10) Patent No.: US 7,207,291 B1
(45) Date of Patent: Apr. 24, 2007

(54) PET FEEDING DISH

(76) Inventor: Thomas R. Watts, 14255 Preston Rd., Apt. #7312, Celina, TX (US) 75009

( * ) Notice: Subject to any disclaimer, the term of this patent is extended or adjusted under 35 U.S.C. 154(b) by 0 days.

(21) Appl. No.: 11/249,574

(22) Filed: Oct. 13, 2005

(51) Int. Cl.
*A01K 5/01* (2006.01)

(52) U.S. Cl. ........................ 119/61.5; 99/442

(58) Field of Classification Search ............ 119/61.5, 119/61.51, 61.53, 61.54, 51.11, 61.57, 72; D30/130; 99/354, 442
See application file for complete search history.

(56) References Cited

U.S. PATENT DOCUMENTS

| | | | | |
|---|---|---|---|---|
| 2,290,396 | A * | 7/1942 | Webster | 249/66.1 |
| D201,670 | S * | 7/1965 | Moore | D30/130 |
| 3,661,121 | A * | 5/1972 | Zielin | 119/61.57 |
| D229,074 | S * | 11/1973 | Cuprak | D30/130 |
| 4,425,368 | A * | 1/1984 | Watkins | 426/107 |
| D285,638 | S * | 9/1986 | Trivison | D7/557 |
| D326,743 | S * | 6/1992 | Haynes | D30/130 |
| 5,676,050 | A * | 10/1997 | Beck | 99/428 |
| 6,539,893 | B1 * | 4/2003 | Otto-Lubker et al. | 119/61.5 |
| 2006/0005774 | A1 * | 1/2006 | Newman Bornhofen | 119/61.5 |

OTHER PUBLICATIONS

Albion's MO, "Portable Dog Bowls," www.albionsmo.com/pr-dog-bowls.asp, at least Feb. 7, 2005 (see web archive last page) pp. 8.*
http://www.petsmart.com/global/product_detail.jsp?ASSORTMENT%3C%3East_id=2534374302023689&FOLDER%C%3Efolder_id=2534374302025875&PRODUCT%3C%3Eprd_id=845524441775466&bmUID=1131814269887&itemNo=0&A=All&Ntt=puppy+pan&previousText=puppy+pan &N=2 pp. 1-2, printed Nov. 12, 2005.

* cited by examiner

*Primary Examiner*—Teri Pham Luu
*Assistant Examiner*—Susan C. Alimenti
(74) *Attorney, Agent, or Firm*—Baker Botts L.L.P.

(57) ABSTRACT

An improved pet feeding dish is herein disclosed for causing pets to eat their mealtime ration at a slower pace. The pet feeding dish generally comprises an annular-shaped trough which compels the pet to move its snout in a circular fashion therethrough, thereby slowing the eating process. Additionally, obstructions in the form of wave-like indentations are formed in the base of the dish to provide for even distribution of food within the dish as well as to cause the pet to reach into each of the furrows created thereby, thus further retarding the eating process. The teachings of the present invention may be adapted for use with virtually any type of pet that is capable of consuming food from a dish structure such as dogs, cats, rabbits, hamsters, gerbils, or other similar type domesticated or non-domesticated animal.

9 Claims, 2 Drawing Sheets

PET FEEDING DISH

BACKGROUND TO RELATED APPLICATIONS

Not applicable.

FIELD OF THE INVENTION

The present invention relates to pet feeding dishes, and more particularly, to an improved pet feeding dish that possesses the necessary structure to compel a pet to consume its food at a slower pace, wherein said structure may include an annular-shaped trough for forcing the pet to maneuver its snout thereabout during the eating process as well as a plurality of obstructions which serve to further reduce the pet's eating speed.

BACKGROUND OF THE INVENTION

Commonly known generic pet feeding dishes comprise a generally bowl-shaped structure into which food is placed upon presentation to the pet. These types of generic pet food dishes are usually sized to accommodate an amount of food that is necessary for the pet's mealtime ration. Nevertheless, placement of the necessary amount of food in the generic feeding dish typically yields an amorphous pile or globular mass which only serves as an enticement for the animal to gobble the food as quickly as possible. It is this hasty consumption of food that has been shown to be detrimental to humans as well as pets.

Throughout this disclosure, the term "pet" may include any generally non-human animal which is owned by a human user for the purposes of amusement, companionship or the like, wherein several examples of these types of pets may include, but are not limited to dogs, cats, hamsters, gerbils, rabbits, ferrets, cattle, horses, and the like. Additionally, it is contemplated that the teachings of the present invention may also be adapted for use with many types of wild animals that are held in captivity such as may be found in a typical zoo.

Although there have been numerous differing types of pet feeding dish designs proposed for use, none of these designs have described a structure which is capable of compelling the pet to eat the mealtime ration at a slower pace. One pertinent example includes U.S. Pat. No. 4,085,706 to Evans, wherein the described structure includes an annular-shaped trough for the placement of pet food therein. This design has several drawbacks which severely limits its ability to motivate the pet to consume the food at a relatively slower pace. First, other than the generally annular-shaped trough, there are no other structural obstructions or irregularities in the surface contour thereof that forces the pet to eat at a slower rate. Secondly, no provisions are taught or suggested to provide a system of a plurality of differing sized dishes, wherein one particular dish may be chosen that is optimally suited for the snout of the pet.

Accordingly, there is still a need in the particular art for an improved pet feeding dish system that provides for an individual feeding dish having dimensional qualities that are optimally suited for the snout of the pet to be fed as well as forcing the pet to eat around predetermined obstructions that are configured therein, thereby motivating the pet to eat at a slower pace.

SUMMARY OF THE INVENTION AND OBJECTIVES

The present invention provides a solution to these needs as well as other needs via an improved pet feeding dish system which motivates pets to eat at a slower pace. The novel pet feeding dish system incorporates a generally annular-shaped trough which forces the pet to progressively move in a circular fashion therearound while eating thus slowing the eating process. Additionally, obstructions in the form of wave-like corrugations are formed in the base of the dish to provide for even distribution of food within the dish as well as to cause the pet to reach into each of the furrows created thereby, thus further retarding the eating process.

The improved pet feeding dish may include a plurality of feeding dishes of differing sizes thereby forming a system that provides for the selection of a particularly sized dish that is optimally sized for the pet's snout. A dish having a trough that is overly large relative to the pet's snout may cause an insufficient slowing action to the eating process due to excessive maneuverability of the pet's snout within the trough. Conversely, a dish having a trough that is too small relative to the pet's snout will not allow for ample access to the food. The system of the present invention provides a solution to this need via a plurality of differing sized feeding dishes, wherein one may be chosen which is optimally sized for each pet, thereby forcing the pet to make coordinated movements of its snout during the eating operation, thereby causing the pet to eat slower.

It is therefore an object of the present invention to provide an improved pet feeding dish which has a structure that is adapted to make pets eat slower.

Another object of the present invention is to provide an improved pet feeding dish system comprising a plurality of feeding dishes of differing predetermined size which allow a user to select one particular dish that is optimally sized for his or her pet.

Another object of the present invention is to provide an improved pet feeding dish which contains at least one obstruction within the trough thereof, which serves to retard the eating process of the pet.

Another object of the present invention is to provide an improved pet feeding dish which may be formed by a one-piece unitary construction in order to lower manufacturing costs and thus lower the cost to the consumer.

These and other objects of the present invention will become readily apparent to those familiar with the construction and use of pet supplies and will become apparent in the following portions of the specification, wherein the detailed description is for the purpose of fully disclosing preferred embodiments of the invention without placing limitations thereon.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENT

Figure 1:
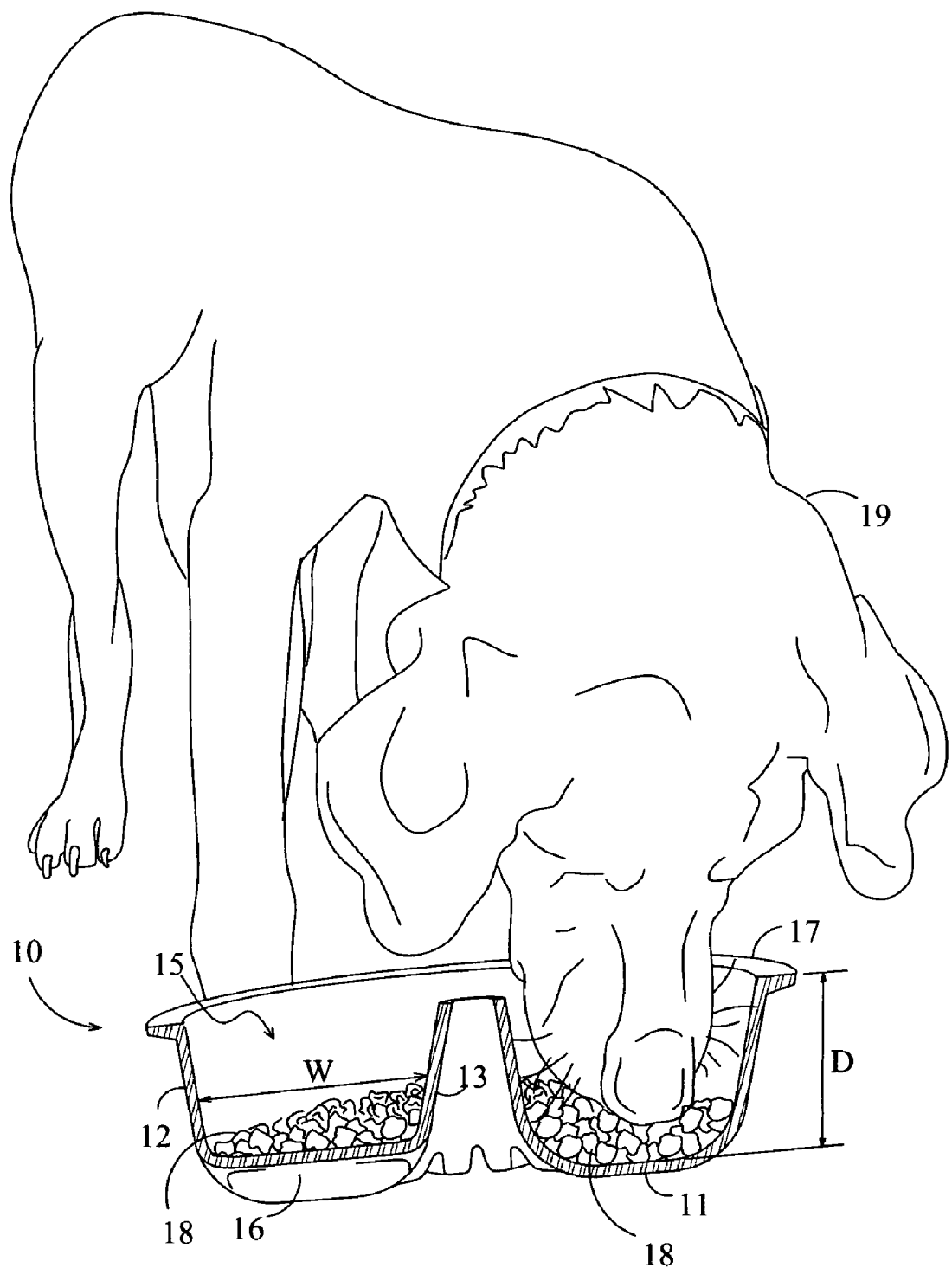
FIG. 1 is a perspective, cross-sectional view of the preferred embodiment according to the present invention shown with pet food disposed therein and a pet which is in the process of eating the food.

Referring now to FIGS. 1 through 4, a preferred embodiment of the improved pet feeding dish of the present invention is designated by the reference numeral 10. FIG. 1 shows a perspective, cross-sectional view of the pet feeding dish 10 having an amount of pet food 18 disposed therein and a pet 19 in the process of the eating the food. The dish 10 generally comprises a base 11, an upwardly extending annular sidewall 12, and a frusto-conically shaped post member 13 which is integrally attached proximate the central portion of the base and extends upwardly therefrom. The annulus formed by the sidewall 12, and post member 13, in conjunction with the base 11 forms a generally ring-shaped trough 15 for the placement of pet food therein. This ring-shaped trough 15 as well as integrally formed obstructions 16 (to be described hereinbelow), which are configured within the trough, serve to limit the amount of pet food that the pet has access to at any given point in time, thus slowing the pet's eating speed.

Optionally, the dish 10 may also include an outwardly extending lip 17 which is integrally attached to the upper edge of the sidewall 11. The lip 17 is adapted to be utilized with structures that are capable of supporting the dish 10 at an elevated position above the ground, wherein an example of one such device is described in Pat. No. D375,819 to Benson which is herein incorporated by reference.

Figure 2:
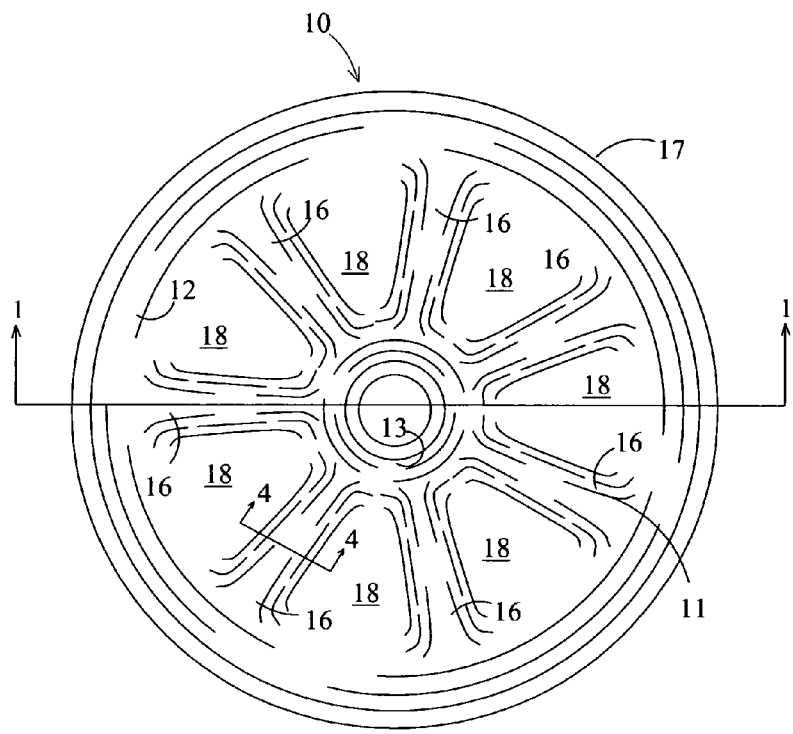
FIG. 2 is a plan view of the embodiment of FIG. 1.
Figure 3:
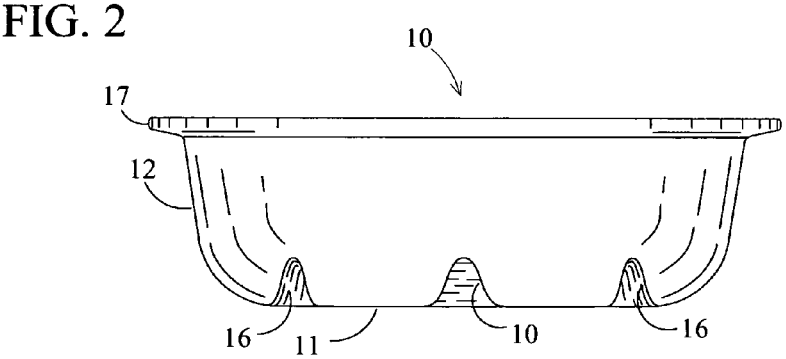
FIG. 3 is an elevational view of the embodiment of FIG. 1.
Figure 4:
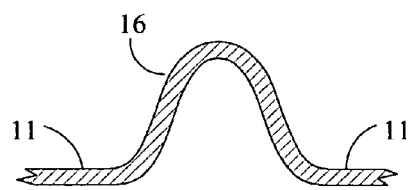
FIG. 4 is a partial, cross-sectional, elevational view of the embodiment of FIG. 1 as taken along the line 4—4 of FIG. 2.

As best shown in FIG. 2, a plurality of upwardly protruding indentations 16, which extend radially outwards from post member 13 to the sidewall 12, are formed in the base 11. The indentations 16, together with the base 11 defines a plurality of furrows 18 or depressions into which pockets of pet food are disposed upon initiation of the pet feeding process. These series of depressions tend to force the pet to reach into each of the depressions, thus providing a slowing action to the eating process. Additionally, the indentations serve to provide a relatively more even dispersal of pet food throughout the trough 15. As shown in the partial, cross-sectional view of FIG. 4, the preferred shape of the indentations are generally wave-like; however it is to be appreciated that the indentations may have any cross-sectional shape that segments the base 11 portion of the dish into a plurality of smaller depressions, wherein several examples may include triangular, or square shapes. Furthermore, it is contemplated that a plurality of indentations may also be formed in either the sidewall 12, or post member 13 to further provide a retarding action to the pet's eating speed. The exemplary shape and configuration of the obstructions show one embodiment that is the preferred mode of practicing the present invention; nevertheless, it is to be understood that any structure which is adapted to cause significant disruption in the pet's eating behavior may fall within the scope of the present invention. The indentations as shown are approximately 1 inch in depth, however it is contemplated that indentations having a depth within the range of 0.6 inches to 1.5 inches may adequately retard the pet's eating speed and thus serve the intended purpose of the present invention.

As described hereinbefore, the generally ring-shaped trough serves to compel the pet to make coordinated movements through the trough during the eating process with its snout, thus slowing its eating behavior. In order to optimize this characteristic, the cross-sectional size of the trough is preferably chosen for each particular pet such that the snout thereof is adapted to fit comfortably within the trough without allowing for excessive maneuverability, thereby defeating the dish's purpose. The present invention provides a solution to this need via a system comprising a plurality of differing sized improved pet feeding dishes, wherein at least one may be optimally chosen for use with any normally sized pet. Given this criterion, a system of improved pet feeding dishes which is adapted for use with domesticated dogs may incorporate a small dish 10 having a mean width W of approximately 3 inches and a depth D of approximately 2.5 inches. Conversely, a larger breed of dog may require a dish 10 having a mean width W of approximately 8 inches and a depth D of approximately 6.5 inches. Thus, a user may select a smaller dish 10 for use during the first months of a dog's life and progress to the larger sized dishes as the dog grows to maturity. FIG. 1 shows a dog that is in the process of eating out of the pet feeding dish of the present invention, wherein the trough thereof is properly sized with respect to the size of the snout of the dog. As shown, the dog may comfortably access all the food within the trough without excessive maneuverability of its snout therewithin.

As best shown in FIG. 1, the cross-sectional shape of the ring-shaped trough 15 is generally U-shaped, wherein the base 11 forms a generally concave-like rounded contour. It is believed that this type of shape most closely corresponds with the shape of the snouts of most commonly known dog breeds. Nevertheless, it is to be understood that the cross-sectional shape of the trough may take on any form such as a rectangular-like shape wherein the base 11 is attached to the sidewall 12 and post member 13 in an essentially perpendicular manner. Moreover, it is contemplated that the cross-sectional shape of the trough may be modified via the teachings of the present invention to relatively correspond to the shape of a snout from virtually any type of pet.

The base 11, sidewall 12, post member 13, indentations 16, and lip 17 are preferably integrally formed from one piece of thermoplastic material using commonly known techniques. The plastic material used should be sufficiently rigid in order to maintain its shape during normal use, provide a relatively long serviceable life, and sufficiently inert such that harmful toxins from the plastic material are not allowed to infiltrate the edible pet food. Those skilled in the art will recognize that there are many plastic formulations which are suitable for this purpose.

It is contemplated that the base 11 may be formed to a shape which is relatively thicker that the sidewall 12 or post member 13. In this manner, increased weight proximate the bottom of the dish 10 should provide for increased stability and thus alleviate most potentially messy spills. Additionally, it is contemplated that the bottom surface of the base may include a layer of material having a high coefficient of friction such as rubber or neoprene which serves to hinder to sliding of the dish over the surface of the ground or floor due to inadvertent horizontal forces placed thereon.

The present invention may be embodied in other specific forms without departing from the spirit or scope of the invention. Thus, specific dimensional qualities and other physical characteristics relating to the disclosed preferred embodiment are not to be considered as limiting, unless expressly stated in the claims. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for feeding a pet in a manner that encourages the pet to eat at a relatively slower pace comprising the steps of:

providing a pet feeding dish comprising a base, an upwardly extending annular sidewall having an upper edge and a lower edge, said lower edge being integrally attached to said base, an upwardly extending post member which is concentrically attached to said base in order to form a generally ring-shaped trough for the placement of pet food therein, the ring-shaped trough having a first depth defined by the distance from the base to said upper edge and also having a maximum width, and a plurality of obstructions which are defined by indentations that are attached to said base, said indentations projecting upwardly into said trough to a sufficient second depth in order to retard a pet's eating speed, said trough having a generally concave-shaped rounded contour and a ratio of the maximum width to the first depth of approximately 1.2;

disposing an amount of pet food in said trough such that said pet food is dispersed generally evenly over said base; and placing said pet feeding dish within access of said pet.

2. The method of claim 1, wherein said second depth of said indentation is within the range of 0.6 inches and 1.5 inches.

3. The method of claim 1, wherein said maximum width which is within the range of 3 inches to 8 inches.

4. The method of claim 1, wherein said a first depth is within the range of 2.5 inches to 6.5 inches.

5. A method for selecting a pet feeding dish that is adapted to provide a retarding action to a pet's eating speed comprising the steps of:

providing a plurality of pet feeding dishes, wherein each of said pet feeding dishes are of a differing size in relation to other said dishes, each of said pet feeding dishes comprising a base, an upwardly extending annular sidewall having an upper edge and a lower edge, said lower edge being integrally attached to said base, an upwardly extending post member which is concentrically attached to said base in order to form a generally ring-shaped trough for the placement of pet food therein, the ring-shaped trough having a first depth defined by the distance from the base to said upper edge and also having a maximum width, and a plurality of obstructions which are defined by indentations that are attached to said base, said indentations projecting upwardly into said trough to a sufficient second depth in order to retard said pet's eating speed, said trough having a generally concave-shaped rounded contour and a ratio of maximum width to first depth of approximately 1.2; and selecting one of said pet feeding dishes which is optimally dimensioned to accommodate the size of said pet.

6. The method of claim 5, wherein said second depth of said indentation is within the range of 0.6 inches and 1.5 inches.

7. The method of claim 5, wherein said maximum width which is within the range of 3 inches to 8 inches.

8. The method of claim 5, wherein said first depth is within the range of 2.5 inches to 6.5 inches.

9. The method of claim 5, wherein said base, said sidewall, said post member, and said indentations are integrally formed from one piece of thermoplastic material.

* * * * *